Oct. 31, 1950  A. M. GRASS  2,527,718
PHASE AND AMPLITUDE RESPONSIVE CONTROL SYSTEM
Filed June 16, 1944
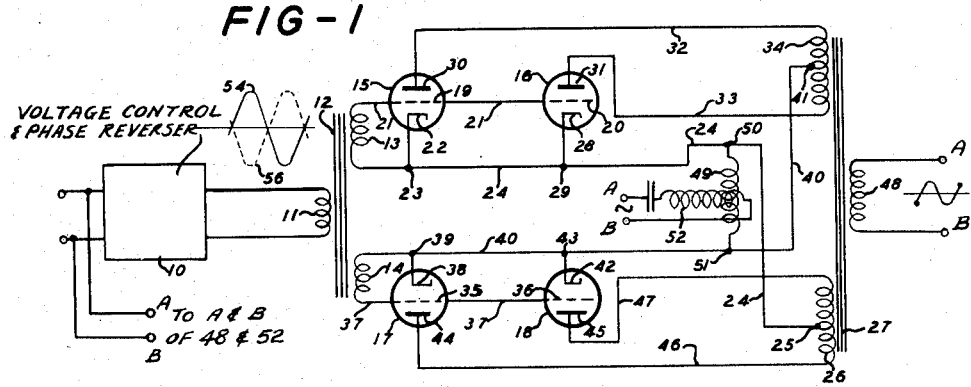
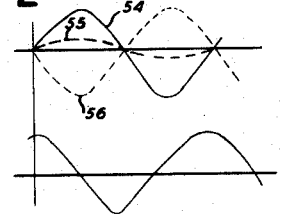
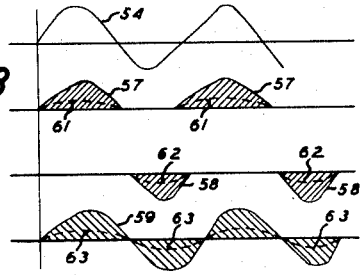
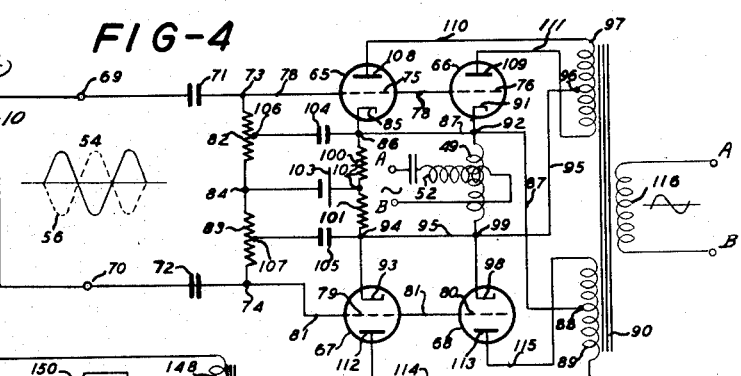
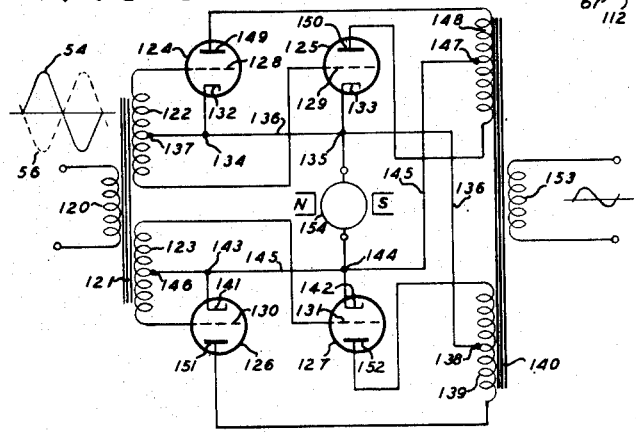
INVENTOR.
ALBERT M GRASS
BY
William D. Hall.
Attorney Patented Oct. 31, 1950

2,527,718

UNITED STATES PATENT OFFICE 2,527,718

PHASE AND AMPLITUDE RESPONSIVE CONTROL SYSTEM

Albert M. Grass, Quincy, Mass., assignor, by mesne assignments, to the United States of America as represented by the Secretary of War Application June 16, 1944, Serial No. 540,602

4 Claims. (Cl. 318—207)

The present invention relates to a motor control system, and it relates more particularly to a vacuum tube driving circuit for controlling the operation and direction of rotation of A. C. or D. C. motors. An example of an application of the present invention would be in a servo mechanism, wherein a sinusoidal control voltage, which might vary in amplitude from a maximum, through zero, to a maximum out-of-phase relation, as determined for instance by a director or data transmitter or by manual means, would be impressed on the vacuum tube apparatus of the present invention, the output of which would be applied to a servomotor or data receiver, which may take the form of a two-phase A. C. motor, or a D. C. motor. The control voltage applied to the apparatus of the present invention may constitute an automatic condition-responsive "error" voltage, the amplitude or phase relation of which may be controlled by the relative position of a load or data receiver with respect to director or data transmitter, or it may be manually controlled.

Heretofore, motors controlled by vacuum tube circuits were subjected to currents having harmonics or D. C. components tending to generate heat in the motor, and sometimes output transformers were resorted to in order to eliminate the D. C. components. One of the objects of the present invention is to provide a motor-control system which will overcome these disadvantages, and which will be compact, economical and efficient in operation.

Referring now to the drawings, wherein like reference characters indicate like parts, Fig. 1 represents a circuit diagram of a control system, for a two-phase A. C. motor, constituting an illustrative embodiment of the present invention;

Fig. 2 is a diagram showing the manner in which the input A. C. control voltage may vary in amplitude and in phase relation; and also showing for the system of Fig. 1 the relation between the output A. C. current applied to the motor winding (which is similar to the input control voltage) and the sine wave applied to the cross-phase motor winding;

Fig. 3 is a diagram showing the relationship of the input voltage and the output current curves, the latter being first shown in its component portions as they are passed through the vacuum tubes;

Fig. 4 represents a circuit diagram of another embodiment of the present invention, also intended for controlling a two-phase A. C. motor, wherein the tubes are of the permanently biased negative cutoff type which require no driving power since the control grids never become positive; and Fig. 5 represents a circuit diagram of still another embodiment of the present invention intended for controlling a D. C. motor.

Referring now to the embodiment illustrated in Fig. 1, an input A. C. control voltage source, symbolically represented by block 10, is impressed across the primary winding 11 of an input control voltage transformer 12 which carries two secondary windings, 13 and 14. This control voltage source 10 is fed from the A. C. power input and its output can be varied in amplitude either in phase or out-of-phase with the A. C. power input. Four vacuum tubes 15, 16, 17 and 18, are provided, 15 and 16 of which are controlled by secondary winding 13, and 17 and 18 by secondary winding 14. These vacuum tubes preferably are non-conducting when their control grids are at zero A. C. potential. This may be achieved by selecting tubes having the proper characteristics for such action, or by inserting resistance in the cathode circuit, or by other means. Considering now vacuum tubes 15 and 16 associated with secondary winding 13, the control grids 19 and 20 thereof are connected to one end of secondary winding 13 through lead 21. Cathode 22 of vacuum tube 15 is connected at junction 23 with lead 24 which extends from the other end of secondary winding 13 to the center-tap point 25 of the secondary winding 26 of a power input transformer 27. Cathode 28 of vacuum tube 16 is also connected to line 24 at the junction 29. The anodes 30 and 31 of vacuum tubes 15 and 16, respectively, are separately connected through leads 32 and 33 to the opposite ends of a second secondary winding 34 in the power input transformer 27.

Vacuum tubes 17 and 18, associated with the secondary winding 14, are connected in similar but opposite fashion. Thus control grids 35 and 36 of these vacuum tubes are connected to one end of the transformer secondary winding 14 through lead 37. Cathode 38 of vacuum tube 17 is connected at junction 39 with lead 40 which extends from the other end of secondary winding 14 to the center-tap point 41 of the secondary winding 34 of power input transformer 27. Similarly, cathode 42 of vacuum tube 18 is also connected to lead 40 at junction 43. The anodes 44 and 45 of vacuum tubes 17 and 18, respectively, are separately connected through leads 46 and 47 to the opposite ends of the secondary winding 26 of power input transformer 27. The A. C. power input is fed into the primary winding 48 of the power transformer 27.

The control winding 49 of the two-phase A. C. servomotor which is controlled by the arrangement illustrated in Fig. 1 is connected across leads 24 and 40 at junctions 50 and 51, respectively. The other or cross-phase winding 52 of the servomotor, represented in phantom fashion by dotted lines in Fig. 1, is driven from an A. C. source of constant magnitude.

The operation of the system illustrated in Fig. 1 is as follows. The input A. C. control voltage may vary in amplitude from a maximum, as represented by sine curve 54 in Fig. 2, to a lesser amplitude, as represented by dashed curve 55, through zero, to a maximum opposite phase relation, as represented by dashed curve 56. It will be assumed that the two secondary windings 13 and 14 of the input control voltage transformer 12 are arranged so that their upper ends are of like polarity, and that the two secondary windings 26 and 34 of the power input transformer 27 are arranged so that their upper ends are of opposite polarity. The A. C. power input applied to the primary winding 48 of the power transformer 27 should be of the same frequency as the applied control voltage, and either in or 180° out of phase therewith. Assuming that the input control voltage applied to the transformer primary winding 11 is of the magnitude and phase relation shown by curve 54, then during the first or positive half of the cycle, when the input control voltage signal makes the upper end of secondary winding 13 most positive, the lower end of the second secondary winding 14 is relatively negative, and the instantaneous conditions then obtaining are as follows. Control grids 19 and 20 of vacuum tubes 15 and 16 are each positive. Since anode 30 of tube 15 is connected with the then positive end of secondary winding 34 and is therefore itself positive, current will flow through tube 15. Tube 16, however, will not conduct since its anode 31 is connected to the then negative end of secondary winding 34. At this same instant, the lower end of secondary winding 14 is of negative polarity and the upper end is of positive polarity making the control grids 35 and 36 of vacuum tubes 17 and 18 negative with respect to the cathode elements 38 and 42. Therefore, neither vacuum tube 17 or 18 will conduct during this positive half of the input cycle. It will thus be seen that during the first or positive half of the input cycle, of the four vacuum tubes provided, only vacuum tube 15 will conduct, the flow being through servomotor winding 49 around the circuit including cathode 22, anode 30, lead 32, secondary winding 34, to center tap point 41 and thence through lead 40, servomotor winding 49 and lead 24, back to the cathode 22. The current passed through vacuum tube 15 during the positive half of the input control voltage cycle is pulsating, as represented by curve 57 in Fig. 3.

During the second or negative half of the input control voltage cycle, all the relative polarities mentioned above are reversed, so that now control grids 35 and 36 of vacuum tubes 17 and 18 become positive with respect to cathodes 38 and 42. Since anode 45 of vacuum tube 18 is connected with the now positive end of secondary winding 26 and is therefore itself positive, current will flow through tube 18. Tube 17, however, will not conduct since its anode 44 is connected to the then negative end of secondary winding 26. At this same instant the lower end of secondary winding 13 is positive and the upper end of that winding is negative, making the control grid elements 19 and 20 of vacuum tubes 15 and 16 negative. Therefore, neither vacuum tube 15 or 16 will conduct during this negative half of the input cycle. It will thus be seen that during the second or negative half of the input cycle, of four vacuum tubes provided, only vacuum tube 18 will conduct, the flow being through servomotor winding 49 around the circuit including cathode 42, anode 45, lead 47, secondary winding 26, to center tap point 25, and thence through lead 24, servomotor winding 49 and lead 40, back to the cathode 42. The current passed through vacuum tube 18 during the negative half of the input control cycle is also pulsating, as represented by curve 58 in Fig. 3.

The combined effect of the positive current pulses 57 passed through tube 15 during the positive half of each input cycle, and the negative pulses 58 passed through vacuum tube 18 during the negative half of each input cycle, provides a composite current wave 59 across the servomotor winding 49, which causes the servomotor to rotate in one direction. It will be seen from Fig. 3 that this resultant motor current curve 59 is similar to and in phase with the applied input control voltage curve 54.

If the amplitude of the control voltage wave is reduced, as for instance to the values represented by the dashed curve 55 of Fig. 2, the amplitude of the positive and negative pulses 57 and 58 (see Fig. 3) would be correspondingly reduced, as represented by pulses 61 and 62, respectively, to produce a composite current wave 63 through servomotor winding 49, of lesser amplitude, but of the same phase, as that represented by curve 59. Thus, change in the amplitude of the input control voltage merely results in a corresponding change in amplitude of the components of the output wave which combine to provide the alternating current through the servomotor winding.

If now the amplitude of the input control voltages applied to the transformer primary winding 11 shifts through zero and changes to an opposite phase relationship, as represented by dashed curve 56 of Figs. 1 and 2, then during the first or negative half of the input control voltage cycle, when the upper end of secondary winding 13 is relatively negative and the lower end of the second secondary winding 14 is positive, the instantaneous conditions then obtaining are as follows. Control grids 35 and 36 of vacuum tubes 17 and 18 are each positive, and the cathodes 38 and 42 thereof are each relatively negative. Since anode 44 of tube 17 is connected with the then positive end of secondary winding 26, and is therefore itself positive, current will flow through tube 17. Tube 18, however, will not conduct, since its anode 45 is connected to the then negative end of secondary winding 26. At the same instant, the upper end of secondary winding 13 is of negative polarity, making the control grid elements 19 and 20 of vacuum tubes 15 and 16 negative. Therefore, neither vacuum tube 15 or 16 will conduct during this first or negative half of the input control voltage cycle. It will thus be seen that during this first or negative half of the input cycle, of the four vacuum tubes provided, only vacuum tube 17 conducts current, the flow then being through the servomotor winding 49 around the circuit including cathode 38, anode 44, lead 46, secondary winding 26, to center tap point 25, and thence through lead 24, servomotor winding 49 and lead 40, back to the cathode 38. The current passed through vacuum tube 17 during this first or negative half of the input control voltage cycle is pulsating, opposite in phase relation to the pulses 57 illustrated in Fig. 3.

During the second or positive half of the input control voltage cycle, all the relative polarities mentioned above are reversed so that now control grids 19 and 20 of vacuum tubes 15 and 16 become positive with respect to cathodes 22 and 28. Since anode 31 of vacuum tube 16 is connected with the now positive end of secondary winding 34, and is therefore itself positive, current will flow through tube 16. Tube 15, however, will not conduct since its anode 30 is connected to the then negative end of secondary winding 34. At the same instant, the lower end of secondary winding 14 is of negative polarity and the upper end of that winding is of positive polarity, making the control grid elements 35 and 36 of vacuum tubes 17 and 18 negative with respect to the cathode elements 38 and 42. Therefore, neither vacuum tube 17 or 18 will conduct during this second or positive half of the input cycle. It will thus be seen that during the second or positive half of the input control voltage cycle, of the four vacuum tubes provided, only vacuum tube 16 will conduct current, the flow being through servomotor winding 49, around the circuit including cathode 28, anode 31, lead 33, secondary winding 34 to center tap point 41, and thence through lead 40, servomotor winding 49 and lead 24, back to the cathode 28. The current passed through vacuum tube 16 during the second or positive half of the input control voltage cycle is also pulsating, opposite in phase relation to the pulses 58 illustrated in Fig. 3.

The combined effect of the negative pulses passed through tube 17 during the negative half of each input cycle, and the positive pulses passed through vacuum tube 16 during the positive half of each input cycle, provides a composite current wave across the servomotor winding 49, which is 180° out-of-phase with the composite wave 59 illustrated in Fig. 3. This causes the servomotor to rotate in an opposite direction to that produced by the current curve 59. It will thus be seen that the resultant motor current curve is similar in form but 180° out-of-phase with respect to the applied input control voltage curve 56.

Therefore, in this first embodiment, when the control voltage is of the phase relation represented by curve 54 in Fig. 2, tubes 15 and 18 alternately conduct current during opposite halves of the input control voltage cycle. However, should the control voltage become of opposite phase relation, as represented by dashed curve 56 in Fig. 2, then tubes 16 and 17 will alternately conduct current during opposite halves of the input control voltage cycle.

If desired, the hereinabove-discussed variations in magnitude or polarity of the A. C. control voltage may be achieved by manually varying circuit resistance, inductance or capacitance, or the position of the control voltage transformer primary relative to the secondaries.

In the embodiment illustrated in Fig. 4, four vacuum tubes 65, 66, 67, and 68 are provided, the tubes operating on the lower portion of their characteristic curves, so that the grids never become positive. These tubes, therefore, require no driving power. The A. C. control voltage input signal is applied across terminals 69 and 70, through blocking condensers 71 and 72, to junctions 73 and 74. The control grids 75 and 76 of vacuum tubes 65 and 66 are connected by lead 78 to junction 73, while control grids 79 and 80 of vacuum tubes 67 and 68 are connected by lead 81 to junction 74.

A resistance network comprising two series resistors 82 and 83, meeting at junction 84, is connected across junctions 73 and 74. Cathodes 85 and 91 of vacuum tubes 65 and 66 are respectively connected at junctions 86 and 92 with lead 87 extending to the center-tap point 88 of a secondary winding 89 on the power input transformer 90. Similarly, cathodes 93 and 98 of vacuum tubes 67 and 68 are respectively connected at junctions 94 and 99 with lead 95 extending to the center-tap point 96 of a second secondary winding 97 in the power input transformer 90. A pair of series cathode resistors 100 and 101, meeting at junction 102, are connected across junctions 86 and 94. The driving voltage for the servomotor winding 49, which is connected across junctions 92 and 99, is developed across cathode resistors 100 and 101. The grid bias may be obtained from a "C" battery 103, whose positive terminal may be connected to junction 102 and whose negative terminal may be connected to junction 84 intermediate the series resistors 82 and 83.

In order to overcome the degenerative effect of this cathode follower tube arrangement, condensers 104 and 105 may be connected across the cathode junctions 86 and 94 on the one hand, and resistor intermediate junctions 106 and 107 on the other hand. The anodes 108 and 109 of vacuum tubes 65 and 66 are separately connected through leads 110 and 111 to the opposite ends of the power input transformer secondary winding 97, while anodes 112 and 113 of vacuum tubes 67 and 68 are separately connected through leads 114 and 115 to the opposite ends of the power input transformer secondary winding 89. The A. C. motor winding may be connected across junctions 92 and 99. The A. C. power input is applied to the primary winding 116 of the power transformer 90.

The operation of the motor control system illustrated in Fig. 4 is as follows. Assuming that the input A. C. control voltage applied across terminals 69 and 70 is represented by the voltage curve 54, and that in this embodiment (as in the one illustrated in Fig. 1) the two power input transformer secondary windings 89 and 97 are arranged so that their upper ends are of opposite polarity, and that the A. C. power input applied to the transformer primary winding 116 is of the same frequency as the applied control voltage and in phase therewith, then during the first or positive half of the cycle, with the control grids 75 and 76 changing in a positive-going direction and control grids 79 and 80 changing in a negative-going direction, the instantaneous conditions then obtaining are as follows. Control grids 75 and 76 of vacuum tubes 65 and 66 are each positive relative to cathodes 85 and 91, in view of the voltage drops across resistors 82 and 100. Since anode 108 of vacuum tube 65 is connected with the then positive end of secondary winding 97, and is therefore itself positive, current will flow through tube 65, around the circuit including cathode 85, anode 108, lead 110, secondary winding 97, center-tap point 96, lead 95, motor winding 49, lead 87, and then back to cathode 85. Tube 66, however, will not conduct, since its anode 109 is connected to the opposite then negative end of secondary winding 97. At this same instant, the control grids 79 and 80 of vacuum tubes 67 and 68 are negative relative to their respective cathodes 93 and 98, so that neither one of these two tubes will conduct during this first or positive half of the input control voltage cycle.

During the second or negative half of the input control voltage cycle, all the relative polarities mentioned above are reversed, so that now control grids 79 and 80 of vacuum tubes 67 and 68 become positive with respect to cathodes 93 and 98. Since anode 113 of vacuum tube 68 is connected with the then positive end of secondary winding 89, and is therefore itself positive, current will flow through vacuum tube 68, around the circuit including cathode 98, anode 113, lead 115, secondary winding 89, center tap point 88, lead 87, motor winding 49, and thence back to cathode 98. Vacuum tube 67, however, will not conduct since its anode 112 is connected to the then negative end of secondary winding 89. At this same instant, the control grids 75 and 76 of vacuum tubes 65 and 66 are negative relative to their respective cathodes 85 and 91, so that neither one of these two tubes will conduct during this second or negative half of the input cycle.

It will therefore be understood that the combined effect of the positive current pulses passed through vacuum tube 65 during the positive half of each input cycle, and the negative current pulses passed through vacuum tube 68 during the negative half of each input cycle, produces a composite A. C. current wave across the motor winding 49, causing the motor to rotate in one direction. In the event that the control voltage should shift through zero and change to a 180° out-of-phase relation, as represented by dashed curve 56 in Fig. 4, the relationship of input signal polarities to transformer polarities reverses, so that now during the first or negative half of each input cycle it will be seen that only vacuum tube 67 conducts, and during the second or positive half of each input cycle, only vacuum tube 66 conducts. The combined effect of these alternating pulses is to produce a composite A. C. current wave across motor winding 49 which is 180° out-of-phase with the A. C. current wave produced when the control voltage curve is represented by 54, so that the motor will now rotate in the reverse direction.

The embodiment shown in Fig. 5 illustrates how an A. C. control voltage, amplified by the circuit of the present invention, may be applied to the winding of a D. C. motor to control not only the extent but also the direction of rotation of the motor. In this embodiment, the A. C. control voltage input signal is applied across the terminals of the primary winding 120 of an input control voltage transformer 121, which carries two center-tapped secondary windings 122 and 123. Four vacuum tubes 124, 125, 126 and 127 are provided, the first two of which are controlled by secondary winding 122, and the last two by secondary winding 123. Thus, control grids 128 and 129 of vacuum tubes 124 and 125 are connected to the opposite ends of secondary winding 122, and control grids 130 and 131 of vacuum tubes 126 and 127 are connected to the opposite ends of the other secondary winding 123. Cathodes 132 and 133 of vacuum tubes 124 and 125 are respectively connected at junctions 134 and 135 with lead 136 extending from center-tap point 137 of secondary winding 122 to a center-tap point 138 of a secondary winding 139 in the power input transformer 140. Similarly, cathodes 141 and 142 of vacuum tubes 126 and 127 are respectively connected at junctions 143 and 144 with lead 145 extending from center-tap point 146 of secondary winding 123 to a center-tap point 147 of a second secondary winding 148 in the power transformer 140. Anodes 149 and 150 of vacuum tubes 124 and 125 are respectively connected with the opposite ends of the power transformer secondary winding 148, and anodes 151 and 152 of vacuum tubes 126 and 127 are respectively connected with the opposite ends of the other power transformer secondary winding 139. The A. C. power input is fed into the primary winding 153 of the power transformer 140.

The winding of the D. C. motor 154 which is controlled by the embodiment illustrated in Fig. 5 may be connected across leads 136 and 145 at junctions 135 and 144. This motor may be a permanent-magnet motor, or it may be a shunt or compound motor with a separately excited field.

The operation of the motor control system illustrated in Fig. 5 is as follows. Assuming that the input A. C. control voltage applied across primary winding 120 is represented by voltage curve 54, and that in this embodiment (as in the one illustrated in Fig. 1) the two secondary windings 122 and 123 of the input control voltage transformer 121 are arranged so that their upper ends are of like polarity, and that the two secondary windings 148 and 139 of the power input transformer 140 are arranged so that their upper ends are of opposite polarity, and further assuming that the A. C. power input applied to the power transformer primary winding 153 is of the same frequency and in phase with the applied control voltage, then during the first or positive half of the input cycle the instantaneous conditions are as follows. Control grids 128 and 131 of vacuum tubes 124 and 127 are each positive with respect to their respective cathodes 132 and 142. Since anode 149 of vacuum tube 124 is then positive and anode 152 of vacuum tube 127 is then negative, only tube 124 will conduct during this first or positive half of the cycle. The negative polarity of control grids 129 and 130 relative to cathodes 133 and 141 of vacuum tubes 125 and 126 prevents any conduction by these tubes during this first half of the cycle. The current passed through vacuum tube 124 follows along the circuit including cathode 132, anode 149, secondary winding 148, center-tap point 147, lead 145, junction 144, D. C. motor winding 154, junction 135, lead 136, junction 134, and thence back to cathode 132.

During the second or negative half of the input cycle, all the relative polarities are reversed, so that now control grids 129 and 130 of vacuum tubes 125 and 126 are positive with respect to their cathodes 133 and 141. Since anode 150 of vacuum tube 125 is then positive, and anode 151 of vacuum tube 126 is then negative, only vacuum tube 125 will conduct during this second or negative half of the cycle. The negative polarity of control grids 128 and 131 relative to cathodes 132 and 142 of vacuum tubes 124 and 127 prevent any conduction through these tubes during this second or negative half of the cycle. The current passed through vacuum tube 125 follows along the circuit including cathode 133, anode 150, secondary winding 148, centertap point 147, lead 145, junction 144, D. C. motor winding 154, junction 135 and thence back to cathode 133. It will be observed that the current passed through vacuum tube 125 and D. C. motor winding 154 during this second or negative half of the input cycle is in the same direction as that passed through vacuum tube 124 and said D. C.

motor winding during the first or positive half of the input cycle, vacuum tubes 124 and 125 being in phase opposition and operating in "push-pull" fashion to maintain unidirectional current flow through the D. C. motor winding during alternate halves of the input cycle. This provides D. C. motor current of full-wave rectification configuration, which is preferable to half-wave rectification configuration.

Because of the unidirection aspect of the resultant current flowing through the D. C. motor winding, the motor will tend to rotate in one direction. However, should the control voltage shift through zero to a 180° out-of-phase relation, as represented by dashed curve 56 of Fig. 5, then the relationship of polarities of the windings of the input control voltage transformer 121 to the polarities of the windings of the power input transformer 140 reverses, so that now during the first or negative half of each input cycle, it will be seen that only vacuum tube 126 will conduct, and during the second or positive half of each input cycle only vacuum tube 127 will conduct. Here again, because of the phase opposition of vacuum tubes 126 and 127, they operate in "push-pull" fashion to maintain unidirectional current flow through the D. C. motor winding 154 during alternate halves of the input cycle, the current flow through the motor winding in this case, however, being in a direction opposite to that resulting when the control voltage curve was represented by 54 with vacuum tubes 124 and 125 conducting. This reversal in direction of current flow through the D. C. motor winding causes the motor to rotate in the opposite direction.

If desired, the circuit illustrated in Fig. 5 may be adapted to employ negative grid cutoff vacuum tubes in a manner similar to that shown in Fig. 4.

The motor control systems hereinabove discussed and forming the subject matter of the present invention are also applicable for use with grid-controlled gas discharge tubes, an example of which is marketed under the trade name "Thyratron."

In view of the present trend of motor manufacturers to increase the impedance of the motors, the output of the present invention may be applied directly to the motor windings without the use of any matching transformers.

Having thus described the invention, what is hereby claimed as new and desired to be protected by Letters Patent is:

1. A control system comprising a power transformer having a primary adapted to be supplied with alternating current and having two center-tapped secondaries, two pairs of electron discharge tubes, each such tube having a cathode, control grid and anode, means for connecting an anode of each tube to an end terminal of said secondaries, one pair of tubes being connected to one secondary, the other pair of tubes being connected to the other secondary, an alternating current motor having one winding through which the magnitude and polarity of current is to be controlled, means for connecting the cathodes of one pair of tubes to one motor winding terminal, means for connecting the cathodes of the other pair of tubes to the remaining motor winding terminal, a center-tap connection from said one secondary going to the cathodes of the other pair of tubes, a center-tap connection from the other secondary going to the cathodes of the one pair of tubes, a source of control voltage of the same frequency as the power transformer current supply, means for varying the amplitude of and changing the phase of said control voltage through 180°, and means for applying said control voltage to the control grids and cathodes of all tubes, said means applying control voltages of the same phase to the one pair of tubes and of opposite phase to the other pair of tubes.

2. In a motor control system including a source of A. C. power, an A. C. control voltage source operating at the same frequency as said power source and adapted to vary from an in-phase to a 180° out-of-phase relation relative thereto and an A. C. motor comprising at least two windings to be fed in phase quadrature, one of said windings connected to said source of A. C., a driving circuit for said A. C. motor including two pairs of vacuum tubes, each vacuum tube having a cathode, a control grid and an anode, a power input transformer having a primary and two center-tapped secondaries, the source of A. C. power being impressed across said primary, the anodes of the first pair of vacuum tubes being connected to the opposite end terminals of one of said transformer secondaries and the anodes of the second pair of vacuum tubes being connected to the opposite end terminals of the other transformer secondary, the cathodes of the first pair of vacuum tubes being connected to the center-tap point of the last-mentioned transformer secondary, and the cathodes of the second pair of vacuum tubes being connected to the center-tap point of the other transformer secondary, the control grids of each pair of said vacuum tubes being coupled together, and to the control voltage source, and the A. C. motor having the other of said windings connected across the cathodes of said pairs of vacuum tubes, said vacuum tubes being so arranged that when the A. C. control voltage is in phase with the A. C. power source, one vacuum tube of each of the aforesaid pairs of vacuum tubes alternately conduct on opposite halves of the cycle thereby tending to rotate said motor in one direction, and when the A. C. control voltage is 180° out-of-phase with the A. C. power source, the other vacuum tube of each of the aforesaid pairs of vacuum tubes alternately conduct on opposite halves of the cycle, thereby tending to rotate said motor in the opposite direction.

3. In a motor control system including a source of A. C. power, an A. C. control voltage source operating at the same frequency as said power source and adapted to vary from an in-phase to a 180° out-of-phase relation relative thereto and an A. C. motor, a driving circuit for said A. C. motor including two pairs of vacuum tubes, each vacuum tube having a cathode, a control grid and an anode, a power input transformer having a primary and two center-tapped secondaries, the source of A. C. power being impressed across said primary, the anodes of the first pair of vacuum tubes being connected to the opposite end terminals of one of said transformer secondaries and the anodes of the second pair of vacuum tubes being connected to the opposite end terminals of the other transformer secondary, the cathodes of the first pair of tubes being connected to the center-tap point of the last-mentioned transformer secondary, and the cathodes of the second pair of tubes being connected to the center-tap point of the other transformer secondary, a control voltage transformer having a primary and two secondaries, the control voltage source being impressed across the control voltage transformer primary, the control grids of said first pair of vacuum tubes being connected to one end terminal of one of said control voltage transformer secondaries, the other end terminal of said last-mentioned secondary being connected to the cathodes of said first pair of vacuum tubes, and the control grids of said second pair of vacuum tubes being connected to one end terminal of the other of said control voltage transformer secondaries, the other end terminal of said last-mentioned secondary being connected to the cathodes of said second pair of vacuum tubes, the motor being connected across the cathodes of said pairs of vacuum tubes.

4. In a motor control system including a source of A. C. power, an A. C. control voltage source operating at the same frequency as said power source and adapted to vary from an in-phase to a 180° out-of-phase relation relative thereto, and a motor, a driving circuit for said motor including two pairs of vacuum tubes, each vacuum tube having a cathode, a control grid and an anode, a power input transformer having a primary and two center-tapped secondaries, the source of A. C. power being impressed across said primary, the anodes of the first pair of vacuum tubes being connected to the opposite end terminals of one of said transformer secondaries and the anodes of the second pair of vacuum tubes being connected to the opposite end terminals of the other transformer secondary, the cathodes of the first pair of vacuum tubes being connected to the center-tap point of the last-mentioned transformer secondary, and the cathodes of the second pair of vacuum tubes being connected to the center-tap point of the other transformer secondary, the control grids of each pair of tubes being connected together and the control voltage source being applied across said grids through a pair of blocking condensers, a resistance network including two series resistors shunted across the control grids of the pairs of vacuum tubes, grid-biasing means intermediate the cathodes and the control grids of each pair of vacuum tubes, a pair of cathode resistors connected across the cathodes of the pairs of vacuum tubes and a pair of condensers connected between the cathodes and an intermediate point of each series resistor, the motor being connected across the cathodes of said pairs of vacuum tubes.

ALBERT M. GRASS.

REFERENCES CITED

The following references are of record in the file of this patent:

UNITED STATES PATENTS

| Number | Name | Date |
|---|---|---|
| 1,958,245 | Mittag et al. | May 8, 1934 |
| 2,218,477 | Parker | Oct. 15, 1940 |